US005720492A

United States Patent [19]
Wanzenried

[11] Patent Number: 5,720,492
[45] Date of Patent: Feb. 24, 1998

[54] RIGID FIFTH WHEEL COVER AND CARRYING BOX

[76] Inventor: Walter Wanzenried, 4603 N. Wail, Spokane, Wash. 99205

[21] Appl. No.: 519,564

[22] Filed: Aug. 25, 1995

[51] Int. Cl.⁶ .................................................. B62D 53/08
[52] U.S. Cl. ........................... 280/433; 280/507; 224/527
[58] Field of Search ................................. 280/507, 433, 280/432; 220/318; 224/42.13, 42.12, 527, 404

[56] References Cited

U.S. PATENT DOCUMENTS

| | | | |
|---|---|---|---|
| 3,741,433 | 6/1973 | Bentley et al. | 220/318 |
| 3,936,077 | 2/1976 | Bliek | 280/423 R |
| 4,169,635 | 10/1979 | Szalay et al. | 308/136 |
| 4,752,081 | 6/1988 | Reeners | 280/433 |
| 4,771,926 | 9/1988 | Anderson et al. | 224/42.13 |
| 5,038,983 | 8/1991 | Tomososki | 280/769 |
| 5,058,914 | 10/1991 | Murcheson | 280/433 |
| 5,165,713 | 11/1992 | Picard | 280/433 |
| 5,303,820 | 4/1994 | Comtois | 206/706 |
| 5,536,031 | 7/1996 | Hurley | 280/507 |

Primary Examiner—Brian L. Johnson
Assistant Examiner—Avraham Lerner
Attorney, Agent, or Firm—David S. Thompson

[57] ABSTRACT

A rigid, removable cover for use on a truck's fifth wheel. The cover is intended for use when the fifth wheel is not being used, and a trailer is therefore not present. The cover prevents dirt and small rocks from becoming lodged in the friction-reducing grease covering the fifth wheel. Such rocks tend to scar and damage the fifth wheel later, when a trailer is attached, and substantial weight is put on the fifth wheel. A carrying box, sized to accept the rigid cover, is provided, and is typically mounted on the back of the truck cab. Notches in the box for the cover's handle require the user to insert the cover into the box with a consistent orientation, thereby preventing the transfer of grease from the one side of the cover to the other. The cover provides a body that is similar in shape to the fifth wheel and a rim that depends around the edge of the fifth wheel skid plate. A handle allows the user to install and remove the cover. Clips lock in place the forward portion of the fifth wheel when the cover is installed, and hold the cover in place during travel. A throat protector keeps debris from entering the throat area of the fifth wheel, between the two skid ramps. The throat protector provides a lip that locks in place over a cross member at the rear of the fifth wheel.

11 Claims, 3 Drawing Sheets

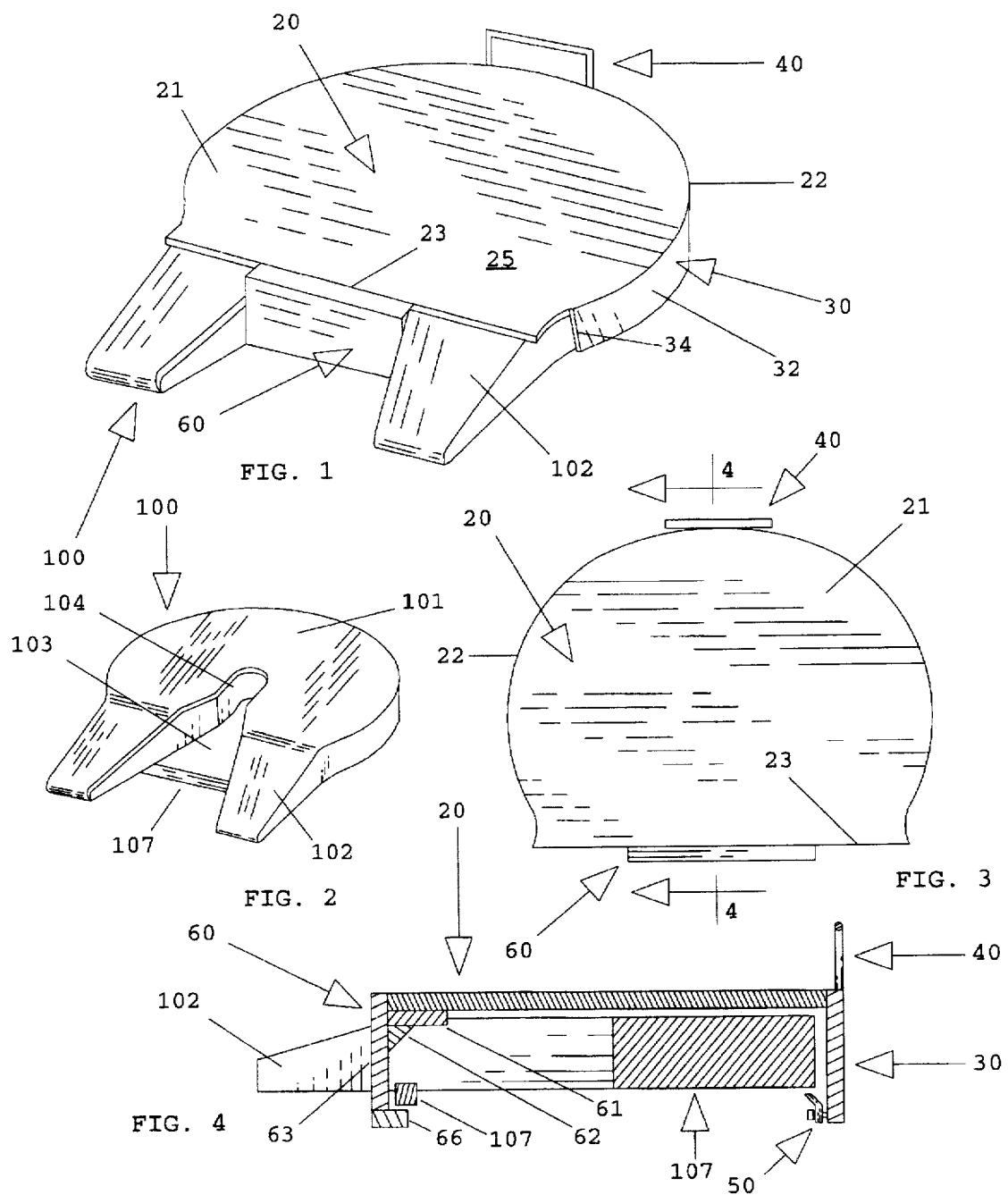

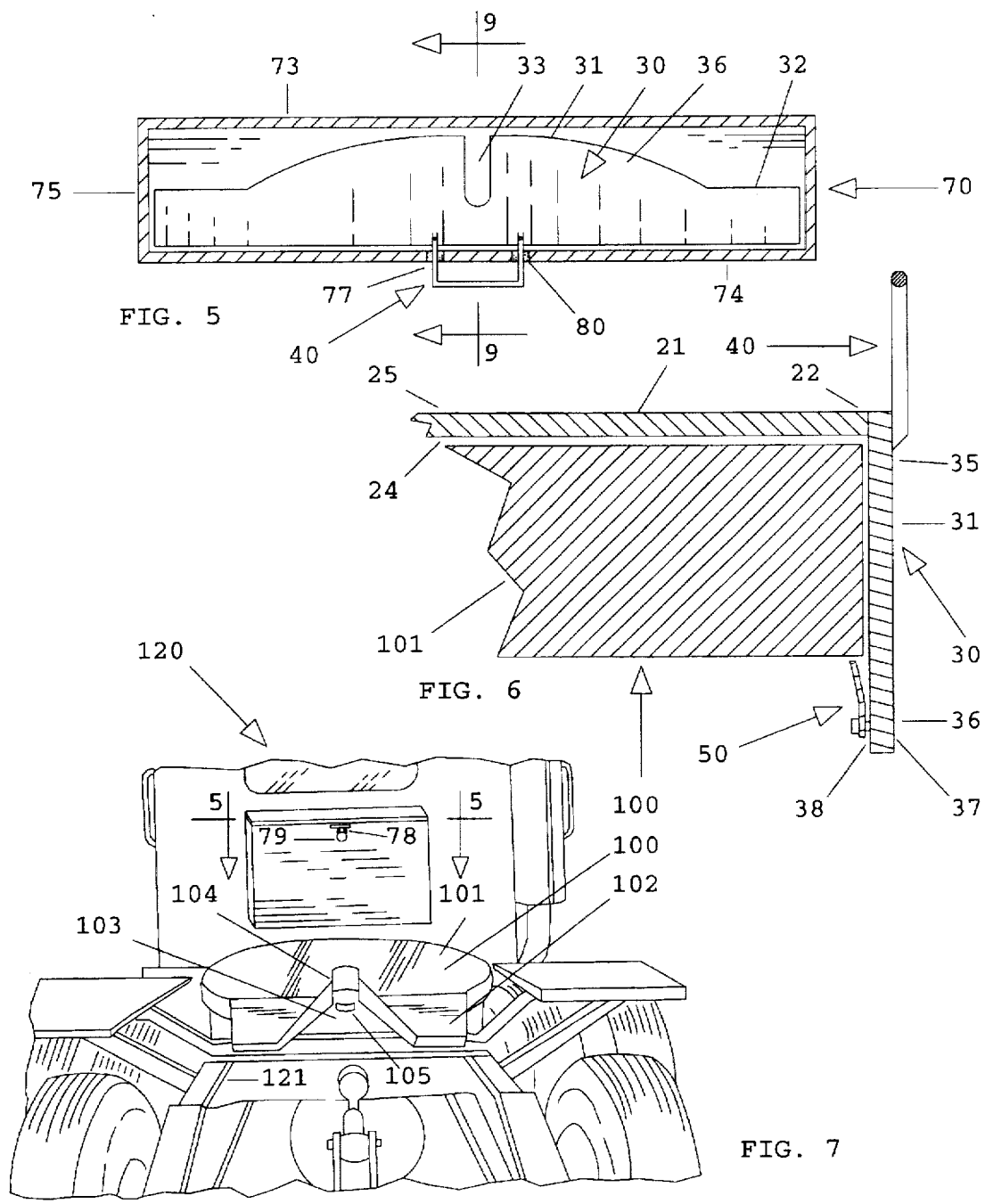

RIGID FIFTH WHEEL COVER AND CARRYING BOX

CROSS-REFERENCES

There are no applications related to this application filed in this or any foreign country.

BACKGROUND

The fifth wheel of an 18-wheel type tractor trailer is a somewhat C-shaped hitch device on the tractor which is used to attach the tractor to the trailer in a pivotal manner. A bearing surface typically called the bearing plate, bolster plate or skid plate on the underside of the forward portion of the trailer is carried in a pivoting manner by a fifth wheel having a similar plate mounted on the rear of the tractor. The weight of the trailer rests on the skid plate portion of the fifth wheel, which in turn is supported by the tractor's frame and wheels that are typically adjacent to the fifth wheel. The skid plate of the fifth wheel hitch is covered with grease to reduce the friction between the tractor and trailer skid plates as the tractor turns.

When the trailer is not in place, the grease covered fifth wheel skid plate is fully exposed. Due in part to its location adjacent to the wheels, the grease covered fifth wheel rapidly attracts dirt and rocks which become embedded in the grease as the tractor is driven without a trailer (commonly referred to as "bob-tailing"). When the fifth wheel is again attached to a trailer, the rocks present in the grease, together with the weight of the trailer, tend to increase friction and make damaging scores in the skid plate's metal surface. This damage may result in the need for expensive repairs, including a new fifth wheel on the tractor and a new plate on the trailer.

Accordingly, there is a need for a cover to prevent the accumulation of rocks and debris in the grease of a fifth wheel when the tractor is driven "bob-tail". A fifth wheel cover is known, but has not been widely adopted, in part because no solution has been found to deal with the grease and mess associated with anything that comes into contact with the grease-covered fifth wheel.

For the foregoing reasons, there is a need for cover for a fifth wheel that can protect an unattached fifth wheel from attracting and retaining rocks and other debris. The cover must be able to protect all portions of the fifth wheel, including the throat area. The cover must be easily stored in a carrying box when not needed, in a manner that will keep it available for use in a moments notice, and in a manner that will not spread the grease in an undesirable manner. The cover must provide structures that will keep it firmly in place on the fifth wheel, despite the windy conditions when the tractor is in motion.

SUMMARY

The present invention is directed to an apparatus that satisfies the above needs. A novel fifth wheel cover that keeps the skid plate of the fifth wheel of a tractor from attracting debris when not attached to a trailer is provided.

The rigid fifth wheel cover of the present invention provides:

(a) A cover body, having a rounded body portion and a curved forward
(b) A cover rim, attached to the curved forward edge of the cover body.
(c) A handle, attached to the cover rim and perpendicular to the cover body, for moving the cover.
(d) Retaining clips, carried by the cover rim, for releasably fastening the cover to the fifth wheel. The retaining clips have an angled body and an end edge. The end edge locks against the bottom of the skid plate of the fifth wheel, keeping the cover in place as the tractor moves.
(e) A throat protector, attached to the cover body.
(f) A carrying box. The box is suitably sized for carrying the cover when it is not in use, and provides a solution to the problem of what to do with a cover having one side covered with grease from the fifth wheel.

A more detailed description includes the following:
(A) The throat protector provides:
(a) A base, attached to the cover body.
(b) A back, having an upper edge and a lower edge, the upper edge attached to the base.
(c) A brace, attached to the base and the back
(d) A lip, attached to the lower edge of the back.
(B) The carrying box provides:
(a) A box body having inside dimensions sized slightly greater than the outside dimensions of the fifth wheel cover.
(b) A hinged top side having a latching or locking mechanism.
(c) Handle notches in the carrying box provide a means to orient the cover within the carrying box. The handle notches allow the handle to stick out of the box, and require the fifth wheel cover to be stored in the carrying box in such a manner that the top of the cover is always oriented in the same direction. This tends to keep the top of the cover clean, and the greasy bottom side of the cover facing the same side of the carrying box.

It is therefore a primary advantage of the present invention to provide a novel cover for a fifth wheel having a cover body and rim that prevents rocks and other debris from becoming lodged in the grease covering a fifth wheel when that fifth wheel is not in use.

Another advantage of the present invention is to provide a fifth wheel cover having a throat protector to prevent debris from entering by way of the throat area between the skid ramps.

A still further advantage of the present invention is to provide a fifth wheel cover having retaining clips on the cover rim which fasten securely to the front of the fifth wheel.

A still further advantage of the present invention is to provide a fifth wheel cover having a lip on the throat protector that attaches to the cross member at the rear of a fifth wheel.

DRAWINGS

These and other features, aspects, and advantages of the present invention will become better understood with regard to the following description, appended claims, and accompanying drawings where:

FIG. 1 shows a perspective view of a version of the cover of the invention installed on a fifth wheel;

FIG. 2 shows a perspective view of the fifth wheel of FIG. 1, with the cover removed;

FIG. 3 shows a top plan view of the version of the cover seen in FIG. 1;

FIG. 4 shows a cross-section of the cover and fifth wheel seen in FIG. 3, taken along the 4—4 lines;

FIG. 5 shows a cross-section of the cover's carrying box seen in FIG. 7, taken on the 5—5 lines, showing the cover inside the box;

FIG. 6 shows a somewhat enlarged cross-sectional view of the cover body and rim, showing the the retaining clips and a portion of the fifth wheel;

FIG. 7 shows a rear view of the back of a typical tractor having a fifth wheel of the type protected by the cover of the invention, and having a carrying box mounted on the tractor;

DESCRIPTION

Figure 9:
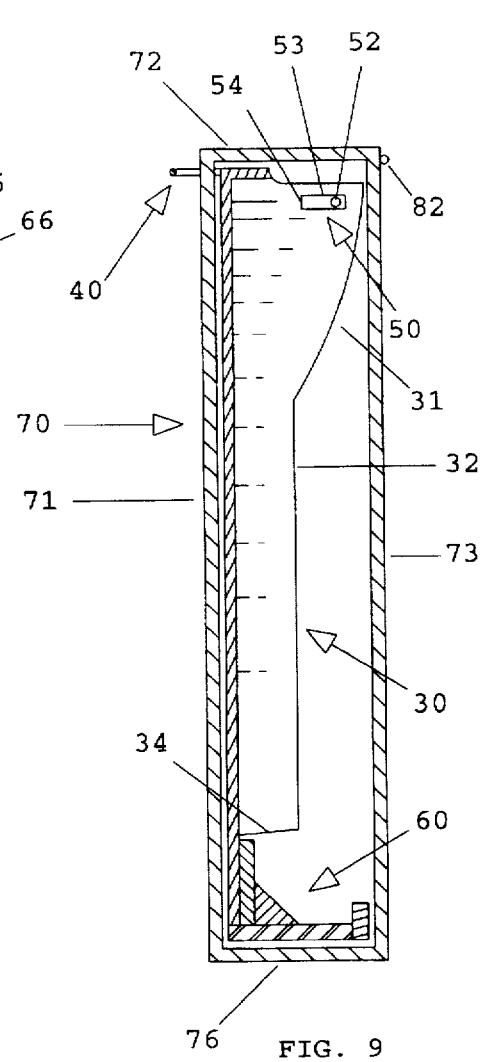
FIG. 9 shows a side cross-sectional view of the cover and carrying box of FIG. 5, taken on the 9—9 lines.

Referring particularly to FIGS. 1, 4 and 9 a fifth wheel cover constructed in accordance with the principles of the invention is seen. As seen in FIG. 1, the fifth wheel cover provides a cover body 20, a cover rim 30, a handle 40 and a throat protector 60, and is mounted in use on a fifth wheel 100 carried by a tractor 120. FIG. 4 provides a view of the retaining clips 50 carried by the cover rim 30. FIG. 9 shows a view of the fifth wheel cover in its storage position in carrying box 70.

The fifth wheel assembly 100 of a conventional tractor 120 provides a skid plate 101 having a generally elliptical shape and an orientation that is roughly parallel to the ground. Two skid ramps 102 are attached to the skid plate 101, and have a somewhat sloping upper surface, as seen particularly in FIGS. 2 and 4. Between the skid ramps 102 is the throat area 103. The coupler jaws 104 provide a narrow track which limits the movement of a king pin (not shown) which is a part of the trailer that is locked into place by the locking mechanism 105 in the center of the fifth wheel skid plate 101. A cross member or mounting plate 107 supports the ends of the skid ramps 102. The entire fifth wheel assembly 100 rests on the tractor frame 121, as seen in FIG. 7.

The cover body 20 is generally elliptical in shape and is sized to cover and extend approximately 0.5 inches over the edge of the skid plate 101 of the fifth wheel 100. The cover body may have to be made in custom sizes to fit some skid plates, but industry standardization indicates that one size will fit a majority of the fifth wheels in use. A typical cover body 20 is approximately ³⁶⁵⁄₈" wide and 25" from lower straight edge 23 to handle 40.

The cover body 20, as seen in FIGS. 1 and 3, provides a generally rounded body portion 21 having a curved forward edge 22 and straight rear edge 23. As seen in FIGS. 4 and 6, the cover provides an inner surface 24 that faces the fifth wheel when the cover is in use, and an outer surface 25, as seen in FIGS. 1 and 3, that is visible when the cover is mounted on a fifth wheel.

The cover may be made of any suitable material, such as fiberglass, wood or a resin-type plastic. The only constraints on the material used is that it should be sufficiently durable and should be resistant to the grease used to lubricate the fifth wheel.

Figure 10:
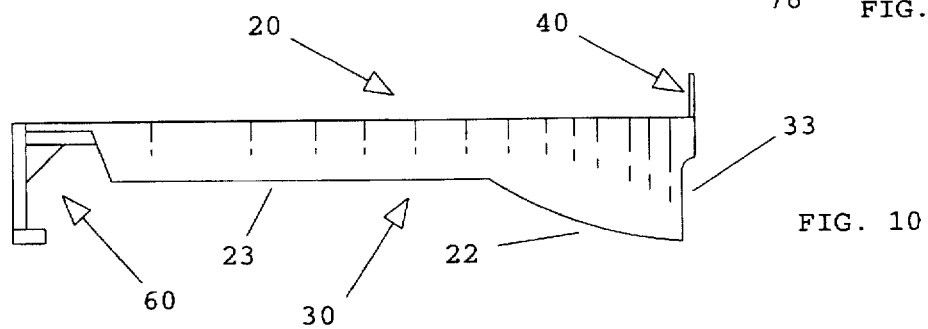
FIG. 10 shows a side view of the cover of FIG. 1.

The cover rim 30 is carried by the curved forward edge 22 of the cover body 20. The top edge 35 of the rim 30 is attached to the curved forward edge 22 of the cover body 20. A bottom edge 36 is best seen in FIG. 6. As seen in FIGS. 5, 6 and 9, a wide center portion 31 extends below the bottom of the skid plate 101. Narrow sides 32 extend from the wide center portion 31 to the end edges 34, as seen in FIGS. 1 and 9. The narrow sides 32 of the rim 30 cover the edges of the skid plate and prevent wind from getting under the cover as the tractor moves down a road. End edges 34 are seen in FIG. 1, near the straight rear edge 23 of the cover body 20. Typically, the wide center portion 31 of the cover rim 30 is approximately 4.25 inches in greatest depth, while the narrow sides 32 are approximately 2 inches in depth. A notch 33, seen in FIGS. 5, 9, and 10, allows the cover to be put on a fifth wheel having a forwardly mounted locking pin (not shown). FIG. 6 shows which is the outside surface 37 and which is the inside surface 38 of the cover rim 30.

A handle 40 is attached to the wide center portion 31 of the cover rim 30 by means of screw fasteners, or alternatively by other fasteners such as bolts.

The fifth wheel cover is held in place on the fifth wheel by retaining means, which typically comprises retaining clips 50. The retaining clips 50 provides an angled clip body 53 having an end edge 54, as seen in FIG. 6, that contacts the bottom of the skid plate 101. Fasteners 52 connect the retaining clips 50 to the cover rim 30, and are typically screws, but alternatively may be any other suitable type of fastener. Each clip provides an angled clip body 53 which is made of a material that has some flexibility, such as spring steel. The angled body 53 tends to flex toward the cover rim 30 when the cover is installed on the fifth wheel 100, and then springs back to the position seen in FIG. 6 after installation.

Figure 11:
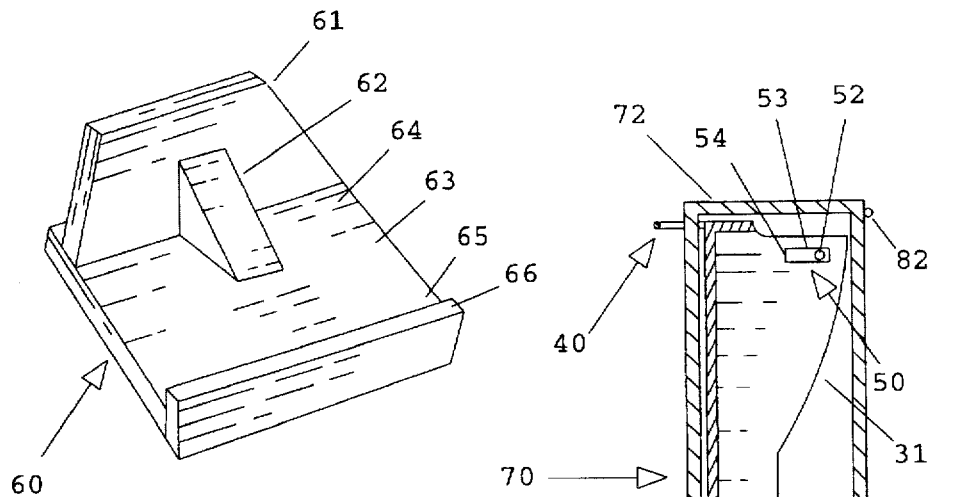
FIG. 11 shows a perspective view of the throat protector portion of the cover, detached from the cover for clarity.
Figure 8:
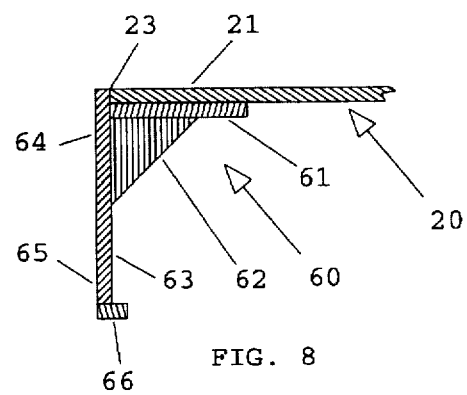
FIG. 8 shows a side view of the throat protector of the cover and a portion of the body of the cover.

The throat protector 60 prevents flying debris from entering the area of the coupler jaws and locking mechanism. As seen in FIGS. 4 and 11, the throat protector 60 provides a base 61 that is attached to the rounded body portion 21 of the cover body 20 in the area of the straight rear edge 23, typically by means of screws or bolts. The base 61 is attached to the back 63, as seen in FIGS. 8 and 11, typically by means of screws. The back provides an upper edge 64 and a lower edge 65, as seen in FIGS. 8 and 11. The upper edge 64 is attached to the straight rear edge 23 of the cover body 20. As seen in FIGS. 8 and 11, as brace 62 is attached to both the base 61 and the back 63, and holds these two pieces together rigidly. Brace 62 is typically a triangular piece of wood, but may alternately be made of other materials and in other dimensions, as long as it continues to function in a similar manner. The lower edge 65 of base 61 is attached to a lip 66, typically by means of screws.

A means to transport the cover when not in use typically comprises a carrying box 70, as seen in FIGS. 5, 7, and 9. The box 70 provides a body 71 having a back 73, a front 74, two sides 75, and a bottom 76. The box top 72 has hinges 82 which attach the top 72 to the body 71. A latch 78, typically suited for use with a padlock 79, is generally provided for security. The inside dimensions of the box 70 should be sized incrementally greater than the outside dimensions of the fifth wheel cover.

The carrying box 70 may be attached to the rear of the cab of the tractor, as seen in FIG. 7, or may be attached to the trailer in any manner desired. The box 70 should be attached to some point that will allow the driver to remove the cover from the fifth wheel and insert the cover into the box in one simple motion, for reasons of convenience.

Cover orientation means, typically providing handle notches 77 in the carrying box 70, require the user to insert the cover into the carrying box in a consistent manner and spatial orientation. As seen in FIG. 9, this orientation of the cover results in the greasy inner surface 24 of the cover body 20 pointing the same way each time the cover is inserted into the box 70. When the cover is inserted into the box 70, the handle 40 extends through the handle notches 77, permitting the handle to be reached from outside the box.

The handle 40 together with handle notches 77 in the carrying box 70 also function as a means to support the cover above the bottom 76 of the carrying box. This tends to keep the cover clean, in the event that grease carried the cover has previously transferred to the bottom 76 of the carrying box 70. When the cover is inserted into the carrying box 70, the handle 40 rests on the bottom 80 of the notches 77 in the carrying box. As a result, the weight of the cover may be supported by the handle 40, and the cover does not have to rest on the bottom 76 of the carrying box.

To attach the rigid fifth wheel cover to the fifth wheel of a tractor, as seen in FIG. 1, the user, holding handle 40, first hooks the lip 66 of the throat protector 60 over the cross member 107 of the fifth wheel 100. The user then manipulates the cover forward, positioning the cover body 20 on top of the fifth wheel skid plate 101. The retaining clips 50 are flexed inwardly, as they pass over the skid plate. Then retaining clips then pop back to their original position, as seen in FIG. 6, as the cover is positioned as seen in FIGS. 1 and 4.

To remove the fifth wheel cover from the fifth wheel of the tractor, the user simply pulls on the handle 40. This causes the cover body 20 and throat protector 60 to flex slightly, allowing the retaining clips to move past the skid plate 101.

To store the rigid fifth wheel cover in the carrying box 70, the user opens the carrying box and orients the cover so that the handle 40 lines up with the handle notches 77 in the carrying box. The cover is then inserted, resting the handle 40 on the bottom 80 of the notches 77, as seen in FIG. 5. The top 72 is then closed, the latch 78 positioned, and the padlock 79 locked.

The previously described version of the present invention has many advantages, including the advantage of providing a cover to prevent rocks and other debris from becoming lodged in the grease covering the fifth wheel carried by a tractor. Another advantage is the protection afforded to the fifth wheel by a throat protector, which prevents debris from entering between the skid ramps. A further advantage is the carrying box, which provides a means to have the rigid cover available when needed and kept clean while not in use. The handle notches of the carrying box provide the advantage of a means to orient the cover within the carrying box and support the cover above the bottom of the box so that contact with grease may be avoided.

Although the present invention has been described in considerable detail and with reference to certain preferred versions, other versions are possible. For example, while the fifth wheel of tractors are fairly standardized in size and shape, and the rigid cover of the invention is sized to fit such a fifth wheel, a somewhat differently sized fifth wheel is possible, and it would be within the scope of the invention to alter the dimensions of the cover to fit such a differently sized fifth wheel. Similarly, the exact dimensions of the cover rim 30 could also be changed without departing from the spirit and scope of the invention. Therefore, the spirit and scope of the appended claims should not be limited to the description of the preferred versions contained here.

What is claimed is:

1. A fifth wheel cover and associated carrying box means, comprising:
   (A) a cover body, having a rounded body portion and a curved forward edge;
   (B) a cover rim, attached to the curved forward edge of the cover body;
   (C) handle means for allowing a user to grasp the cover;
   (D) retaining means, carried by the cover rim, for releasably fastening the cover to the fifth wheel;
   (E) a throat protector, attached to the cover body, comprising:
      (a) a base, attached to the cover body;
      (b) a back, having an upper edge and a lower edge, the upper edge attached to the base; and
      (c) a lip, attached to the lower edge of the back; and
   (F) wherein the carrying box means for carrying the cover is sized to enclose the fifth wheel cover.

2. The fifth wheel cover of claim 1, in which the retaining means comprises a retaining clip.

3. The fifth wheel cover of claim 2, in which the retaining clip comprises an angled body having an end edge.

4. The fifth wheel cover of claim 1, in which the hands means comprises a handle carried by the cover rim, perpendicular to the cover body.

5. A fifth wheel cover, for protecting the fifth wheel of a tractor when the tractor is not connected to a trailer, comprising:
   (A) a cover body, having a rounded body portion and a curved forward edge;
   (B) a cover rim, attached to the curved forward edge of the cover body;
   (C) handle means for allowing a user to grasp the cover;
   (D) retaining means, carried by the cover rim, for releasably fastening thecover to the fifth wheel; and
   (E) a throat protector, attached to the cover body, comprising:
      (a) a base, attached to the cover body;
      (b) a back, having an upper edge and a lower edge, the upper edge attached to the base; and
      (c) a lip, attached to the lower edge of the back.

6. The fifth wheel cover of claim 5, in which the throat protector additionally comprises:
   (a) a brace, attached to the base and the back.

7. A fifth wheel cover and associated carrying box means, comprising:
   (A) a cover body, having a rounded body portion and a curved forward edge;
   (B) a cover rim, attached to the curved forward edge of the cover body;
   (C) a handle, attached to the cover body;
   (D) retaining means, carried by the cover, for releasably fastening the cover to the fifth wheel;
   (E) a throat protector, attached to the cover body, comprising:
      (a) a base, attached to the cover body;
      (b) a back, having an upper edge and a lower edge, the upper edge attached to the base; and
      (c) a lip, attached to the lower edge of the back; and
   (F) wherein the carrying box means for carrying the cover is sized to enclose the fifth wheel cover.

8. The fifth wheel cover and associated carrying box means of claim 7, in which the carrying box means comprises:
   (a) a box body having inside dimensions sized incrementally greater than the outside dimensions of the fifth wheel cover;
   (b) a top, supported by hinges on the box body; and
   (c) cover orientation means for requiring the user to insert the cover into the box in a particular orientation.

9. The fifth wheel cover of claim 8, in which the carrying box means further comprises a top having a locking or latching mechanism.

10. A fifth wheel cover and associated carrying box means, comprising:
   (A) a cover body, having a rounded body portion and a curved forward edge;
   (B) a cover rim, attached to the curved forward edge of the cover body;
   (C) a handle, attached to the cover body;
   (D) retaining means, carried by the cover, for releasably fastening the cover to the fifth wheel;
   (E) a throat protector, attached to the cover body; and
   (F) wherein the carrying box means for carrying the cover is sized to enclose the fifth wheel cover, and comprises:
      (a) a box body having inside dimensions sized incrementally greater than the outside dimensions of the fifth wheel cover;
      (b) a top, supported by hinges on the box body; and
      (c) cover orientation means, for requiring the user to insert the cover into the box in a particular orientation, comprising handle notches in the carrying box means.

11. A fifth wheel cover and associated carrying box, comprising:
   (A) a cover body, having a rounded body portion and a curved forward edge;
   (B) a cover rim, attached to the curved forward edge of the cover body;
   (C) handle means, attached to the cover rim and perpendicular to the cover body, for moving the cover;
   (D) retaining clip means, carried by the cover rim, for fastening the cover to the fifth wheel, comprising a retaining clip having an angled body and having an end edge;
   (E) a throat protector, attached to the cover body comprising:
      (a) a base, attached to the cover body;
      (b) a back, having an upper edge and a lower edge, the upper edge attached to the cover body;
      (c) a brace, attached to the base and the back; and
      (d) a lip, attached to the lower edge of the back; and
   (F) wherein the associated carrying box, for supporting the cover when not attached to a fifth wheel, comprises:
      (a) a box body having inside dimensions sized incrementally greater than the outside dimensions of the fifth wheel cover;
      (b) a top, supported by hinges on the box body, having a latching mechanism; and
      (c) cover orientation means, for preventing storage of the fifth wheel cover in the carrying box with incorrect orientation, comprising handle notches in the carrying box.

* * * * *